Figure 1:
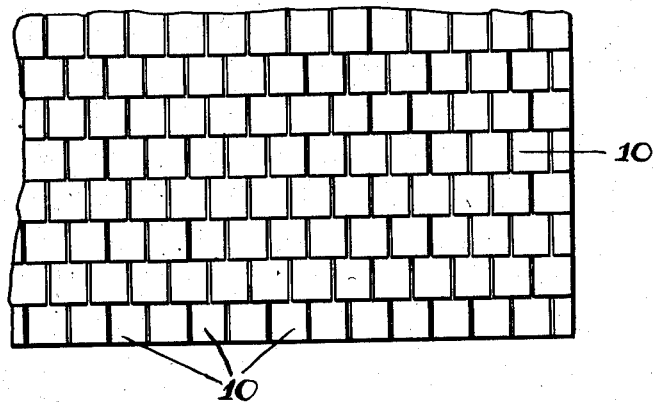

May 23, 1939.  W. O. LYTLE  2,159,665
VITREOUS SHINGLE
Filed Nov. 30, 1936

INVENTOR.
WILLIAM O. LYTLE
BY Bradley T Bee
ATTORNEYS.

Patented May 23, 1939

2,159,665

UNITED STATES PATENT OFFICE 2,159,665

VITREOUS SHINGLE

William O. Lytle, New Kensington, Pa., assignor to Pittsburgh Plate Glass Company, Allegheny County, Pa., a corporation of Pennsylvania Application November 30, 1936, Serial No. 113,422

4 Claims. (Cl. 108—10)

The present invention relates to the provision of sheathing units for buildings and it has particular relation to the provision of shingle-like external sheathing or facing units which are composed of a material which upon breakage will shatter in its entirety into minute fragments.

One object of the invention is to provide shingle units composed of hard, weather resistant material which upon accidental breakage can readily be dislodged from position between adjacent units without danger of breaking the latter.

A second object of the invention is to provide shingle units which when arranged in overlapping courses are not subject to breakage by expansion of ice between overlapping units or by unequal expansion between exposed and unexposed portions of the shingles.

A third object is to provide a shingle of glass which upon breakage will not constitute a menace to persons or objects below even when the shingles are not supported by sheathing.

These and other objects of the invention will be apparent from consideration of the following specification and claims.

Slates and tiles have long enjoyed wide use as sheathing elements in roofs and similar structures where a high degree of resistance to weathering is required. Such materials are highly frangible and breakage due to thermal and mechanical stresses incidental to service is frequent. Moreover, they are frequently of porous nature and the permeation of moisture followed by freezing results in gradual disintegration. They are also totally opaque and can not be used where transparency is desired.

Common glass has certain properties, such as great resistance to permeation by water, resistance to weathering and transparency or translucency which would render it valuable as an external sheathing or facing material for both the roofs and the side walls of buildings. However, it is so frangible that it has not heretofore enjoyed any substantial use except in the form of easily replaceable panes enclosed in reinforcing frames, such as are employed in the fabrication of windows, skylights, greenhouses, etc. In the latter structures, the glass is uniformly exposed to radiation throughout its area so that there is no differential of thermal expansion with resultant breakage. Also, no opportunity is afforded for water to seep between superposed sheets to freeze and cause breakage. Moreover, a broken pane is always completely accessible and can be easily detected and removed from its frame and replaced by the simple methods of glazing without danger of breaking adjacent units. Light sheet units suitable for laying in overlapping courses resembling shingles or slates were heretofore impracticable because the units were too frangible, and breakage as a result of unequal expansion or freezing of water between the units, or as a result of mechanical forces was too frequent.

Unlike a pane of glass in a window frame or annular frame, a broken shingle in an assemblage of overlapping units could not be detected or easily replaced. Usually a stub remained secured between the shingles of the adjacent courses. In order to remove it, it was often necessary to break it up and pick out the pieces. This operation was difficult and often involved danger of breaking adjacent shingles.

As a result of these various types of failure, about 25 per cent of the units composed of ordinary glass can be expected to break in normal service within a comparatively short period of time. The expense of replacing these broken units is very heavy. Risk of injury to persons or objects by falling fragments is substantial.

The present invention involves the provision of a shingle-like external sheathing or facing unit from relatively light sheets of so-called "tempered" glass. These units are characterized by the fact that upon any breakage, they shatter completely into minute bits which can be easily removed from under the unbroken shingles to admit of insertion of new units. Such units will withstand flexure by expansion of ice and differential expansion created by uneven heating of exposed and unexposed portions.

Figure 2:
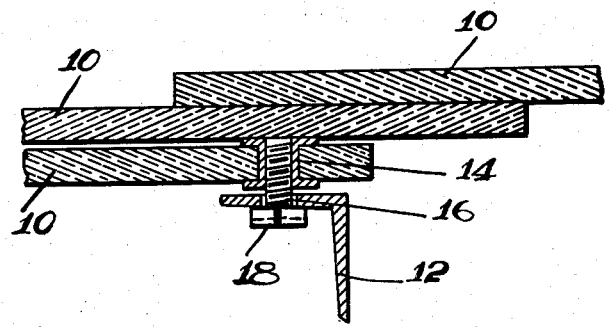

For a better understanding ot the invention reference may now be had to the accompanying drawing, in which Figure 1 is a plan view of a portion of an exterior of a building having a sheathing of shingles embodied by the present invention. Fig. 2 is a sectional view of a portion of a shingle assembly showing a convenient method of securing the shingles in place.

In the drawing, like numerals refer to like parts. In the embodiment of the invention disclosed, shingles 10 of any desired pattern (e. g., rectangular) are arranged in conventional manner upon a supporting structure embodying conventional furrings or purlins 12. The latter may be of metal and preferably are of channel, angular or similar cross sectional contour to provide maximum strength with minimum weight.

Substantially any convenient means may be employed in locking the shingles in place. Hooks or clamps, such as disclosed in United States Patent No. 1,574,099 constitute examples of such devices. The shingles may also be bored or notched to receive nails, screws, bolts, pins, studs or other devices which are attached to the furrings 12 in conventional way.

In the form of the invention illustrated in Fig. 2 of the drawing, the glass is pierced to receive a threaded sleeve or bushing 14 which may be of iron, copper, aluminum, lead, rubber, etc. These bushings may be pre-formed to fit the holes in the glass, but if composed of soft material, may be formed as blanks which are pressed or upset into the holes. In the event that the bushing is of soft material, such as rubber, the bolt may be replaced by a conventional wood screw which is threaded upwardly into the bushing without preliminary provision of internal threads.

Bolts and screws may be replaced by nails, cotter pins, or rivets which are upset or bent at one or both ends to lock the shingles in position.

A highly important feature of the present invention resides in the ease with which units broken by violent impacts or flexures may be replaced. It has already been pointed out that in the case of breakage of a shingle composed of ordinary glass, this operation is usually difficult because the stub of the broken shingle seldom can be released without breaking it up. In event the shingles are held by bolts or nails, much labor may be involved in breaking up that portion of the unit between the adjacent courses. Even where clamps are employed, it is usually necessary to bend or break the clamp. In performing these operations, risk of breakage of adjacent shingles is considerable.

By use of the tempered glass shingles embodied by the present invention, these difficulties are largely or completely obviated because breakage of any portion of a shingle results in its complete shattering into tiny fragments free of cutting edges, which either drop out automatically, or if they are held by adjacent units, they can easily be picked or pushed out by means of a suitable instrument.

If ordinary nails, bolts or rivets, or similar devices are employed to hold the shingle, they may usually be clipped by means of a chisel and removed to clear the space for insertion of the next unit. In event a device of the type disclosed in Fig. 2 of the drawing is employed to hold the shingles, it is merely necessary to unscrew the bolt 16 from the bushing 14. The latter then drops out with the fragments of glass leaving the space free for insertion of a new shingle, which is then locked in place by threading a bolt into the bushing 14.

This requires but a moment and the repair is perfect in function and appearance.

In many instances, where some form of threaded screw or bolt is employed to hold down the shingles, it is possible to back off the bolts sufficiently to allow the shingles which overlap the broken one to be lifted slightly, thus admitting of insertion of the repair unit from below. Construction of external scaffolding for making repairs is thus avoided. In the case of steep and high roofs, this is an important feature. With ordinary shingles which do not shatter upon breakage, such mode of repair is difficult if not impossible.

The fastening devices are also readily removed if bolts or rivets having small heads countersunk in the glass are secured in openings in the furrings of sufficient size to permit the heads to pass through. Upon removal of the shingle, the bolts drop out automatically.

If notches are provided in the edges of the furrings for retention of the holding devices, conventional bolts or rivets may be employed and upon shattering of the shingle may be removed instantly.

A shingle with a bushing 14 for receiving a screw device is highly convenient for replacing broken shingles embodying any of these holding devices. However, numerous other devices may be employed for the purpose, such devices including wires, lamps, etc. The clamp shown in Patent No. 1,574,099 is an example of such devices.

In fabrication, the shingles may be formed in various ways. For example, sheets may be drawn from a furnace and cut to size like panes of window glass. Plates may also be cast or pressed in accordance with conventional practice. Such plates may be initially formed to requisite size, and shape, or they may be formed in sizes which are multiples of those of the finished shingles and then cut up into a plurality of units. Preferably for reasons of economy, as well as to reduce sheen and reflection, the sheets are left rough. However, if desired, they may be ground and polished. Units in their final size and shape are tempered by conventional methods. One such method involves heating the units to a temperature near the softening point (about 1100 deg. F.) and then rapidly cooling them by such means as a blast of air of suitable temperature or by plunging them into a tempering bath of oil, molten lead, or salts, etc. As a result of this treatment, the glass is placed under strong, internal strain, which upon any rupture of the surface of the glass causes the entire body to shatter into small rounded fragments. The strength of the glass is also increased several fold over that of ordinary glass of like dimensions.

The shingles may be formed from clear glass for maximum radiation, transmission, or they may be formed of glass containing pigments and other ingredients which have the effect of coloring or of partially or completely opacifying the glass with respect to certain or all portions of the spectrum. The formulation of such glasses is conventional. Any type of glass susceptible of tempering may be employed though for reasons of economy, ordinary lime-soda-sand glass will be preferred for most purposes.

Because of the great mechanical strength of the tempered glass, relatively thin sheets may be employed. Usually thicknesses of about $\frac{1}{8}$ or $\frac{1}{4}$ inch are quite sufficient to withstand all stresses to which the shingles are likely to be subjected in ordinary service.

The shingles because of their inherent strength may be made with safety in much larger sizes than can shingles prepared from ordinary glass. The labor involved in laying such shingles is less than that of laying shingles of ordinary untempered glass. Fewer members are required in the supporting framework, which, of course, is in the interest of economy and less obstruction is offered by the framework to transmission of light.

The shingles may be square, rectangular, diamond shape, trapezoidal, may have notched or scalloped edges, or be of any other edge contour calculated to give a pleasing roof design, or to promote ease or permanence of securing. The shingles may also be formed with a feathered edge similar to that of conventional wood shingles thereby promoting uniformity of contact between overlapping surfaces. Any ridges, grooves or other protuberances which may be desirable from the standpoint of utility or ornamentation may be formed in the shingles.

Shingles formed of tempered glass will withstand the impact of hailstones or any other missile which is likely to strike them without breakage. They will also withstand the force of ice formed by seepage and freezing of water between superposed portions.

Likewise they do not break because of unequal expansion caused by variations of temperature between exposed and unexposed portions. Similarly because of the low coefficient of expansion and because of the great strength of the glass sheets, there is practically no danger of breakage by reason of excessive pressure created by expansion or contraction of the clamps employed to secure them in position.

The shingles are impermeable to water and practically perfectly resistant to weathering or to the action of most chemicals.

Tempered glass shingles are highly useful for roofing buildings and the more or less transparent or translucent forms are excellent in the fabrication of skylights because they admit light and at the same time the natural appearance of the roof is preserved throughout.

They are also of value as a means for sheathing the side walls of buildings because their great strength makes them resistant to the numerous impacts from various instrumentalities which most usually move in proximity to the side walls of buildings.

The forms of the invention herein shown and described are given merely as examples. Numerous modifications may be made therein without departure from the spirit of the invention or the scope of the appended claims.

What I claim is:

1. A building structure comprising spaced purlins, a sheathing comprising glass plates arranged in overlapping courses, said plates having opposite ends resting upon the purlins and securing devices for fastening the plates to the purlins, said securing devices having portions exposed and operable from the rear of the sheathing to permit the removal and replacement of any particular securing device without disturbing the adjacent devices, said plates being composed of glass, so tempered that when a surface of a plate is broken it will disintegrate into small rounded fragments that can be readily removed from between the overlapping plates to permit insertion of a new plate.

2. A structure as defined in claim 1 in which the shingles are pierced to receive the securing devices.

3. A sheathing structure for a building comprising shingles arranged in overlapping courses, said shingles being secured upon an underlying framework by securing devices having portions exposed from one face of the sheathing and being operable to admit of sliding a new shingle into position under the overlapping shingles while the latter are in position, said shingles being composed of glass tempered to provide an internal strain which will cause shattering of the shingles into small rounded fragments upon rupture of the surface thereof whereby broken shingles may be removed and replaced by new shingles without substantially disturbing the adjacent shingles.

4. A sheathing structure for a building comprising shingles arranged in overlapping courses upon an underlying framework, said shingles being pierced to receive devices securing them to the framework, and further being composed of glass tempered to provide an internal strain that will cause shattering of the shingles into small rounded fragments upon rupture of the surface thereof, to leave the securing devices free under the overlying shingles upon breakage of a single shingle without substantially disturbing the adjacent shingles.

WILLIAM O. LYTLE.